(12) United States Patent
Hagl et al.

(10) Patent No.: US 8,629,763 B2
(45) Date of Patent: Jan. 14, 2014

(54) RFID TRANSPONDER WITH IMPROVED WAKE PATTERN DETECTION AND METHOD

(75) Inventors: Andreas Hagl, Dachau (DE); Ernst Muellner, Munich (DE)

(73) Assignee: Texas Instruments Deutschland GmbH, Freising (DE)

( * ) Notice: Subject to any disclaimer, the term of this patent is extended or adjusted under 35 U.S.C. 154(b) by 626 days.

(21) Appl. No.: 12/629,694

(22) Filed: Dec. 2, 2009

(65) Prior Publication Data

US 2010/0141389 A1   Jun. 10, 2010

Related U.S. Application Data

(60) Provisional application No. 61/141,446, filed on Dec. 30, 2008.

(30) Foreign Application Priority Data

Dec. 2, 2008   (DE) .......................... 10 2008 060 082

(51) Int. Cl.
*H04Q 5/22*   (2006.01)
(52) U.S. Cl.
USPC ............... 340/10.3; 340/10.31; 340/10.34; 455/132; 455/234.1
(58) Field of Classification Search
USPC ....................................... 340/10.3
See application file for complete search history.

(56) References Cited

U.S. PATENT DOCUMENTS

| 4,380,737 | A | * | 4/1983 | Sanders ....................... 330/134 |
| 6,130,602 | A | * | 10/2000 | O'Toole et al. ............ 340/10.33 |
| 6,323,566 | B1 | | 11/2001 | Meier |
| 6,489,886 | B2 | | 12/2002 | Meier |
| 2002/0175806 | A1 | * | 11/2002 | Marneweck et al. ...... 340/10.33 |
| 2005/0237161 | A1 | * | 10/2005 | Lee et al. ................... 340/10.33 |

FOREIGN PATENT DOCUMENTS

EP   1747528   11/2008

\* cited by examiner

*Primary Examiner* — Daniel Wu
*Assistant Examiner* — Frederick Ott
(74) *Attorney, Agent, or Firm* — William B. Kempler; Wade J. Brady, III; Frederick J. Telecky, Jr.

(57) ABSTRACT

An RFID transponder is provided which includes an automatic gain control (AGC) stage for amplifying a radio frequency (RF) signal and for providing an amplified RF signal. The AGC stage has a control signal indicating an increase of the amplitude of the RF signal. A demodulator is coupled to receive the amplified RF signal for demodulating the amplified RF signal. The demodulator provides a data signal. A burst detector is coupled to receive the control signal of the AGC stage and adapted to provide a start signal in response to a change of the control signal. A wake pattern detector is coupled to receive the data signal and the start signal. The wake pattern detector is adapted to detect a predefined wake pattern in the data signal after having received the start signal and to issue a wake signal if the predefined wake pattern is detected for switching the RFID transponder from a first operating mode into a second operating mode having higher power consumption than the first operating mode.

10 Claims, 7 Drawing Sheets

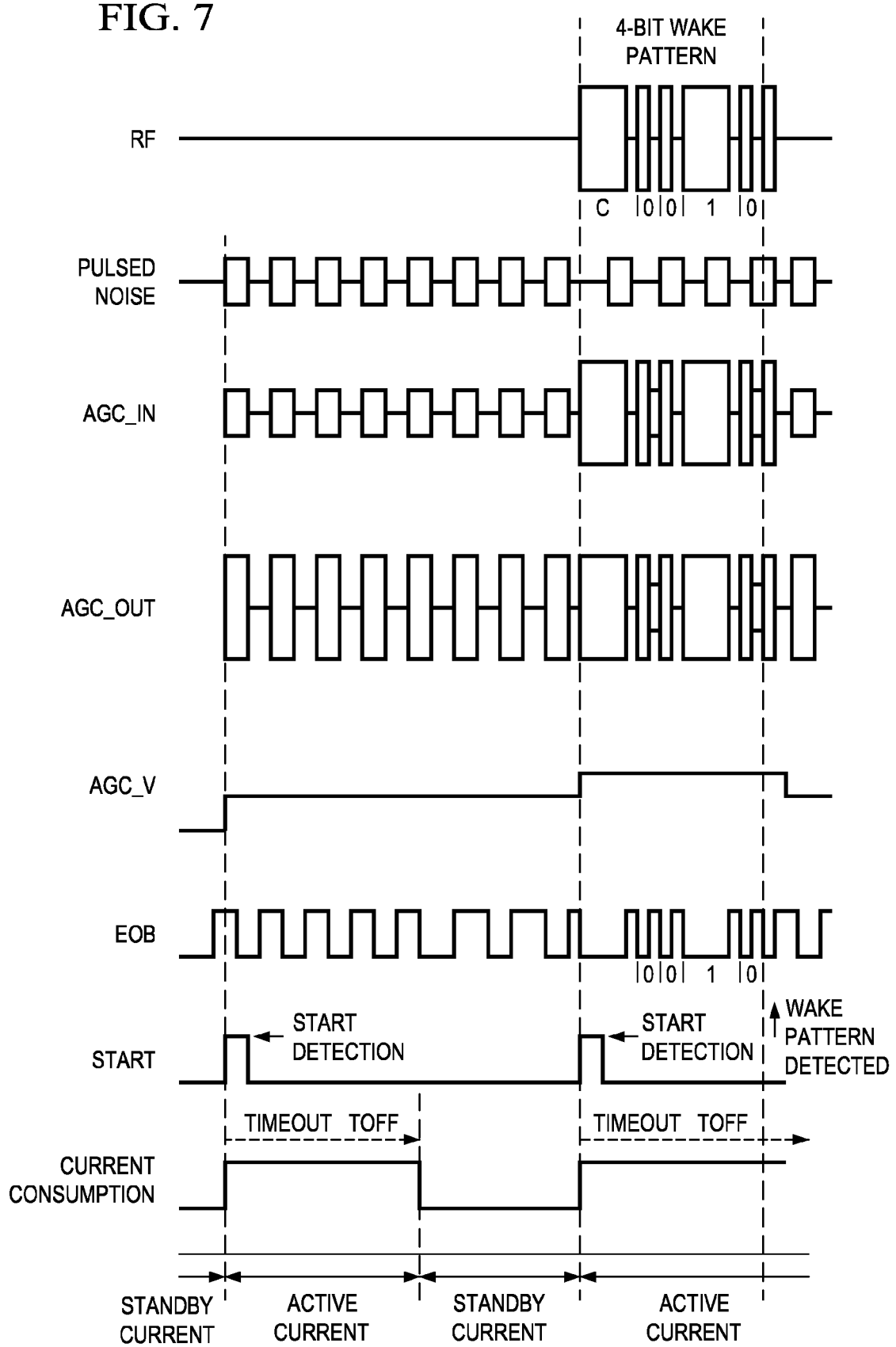

RFID TRANSPONDER WITH IMPROVED WAKE PATTERN DETECTION AND METHOD

CROSS-REFERENCE TO RELATED APPLICATIONS

This patent application claims priority from German Patent Application No. 10 2008 060 082.2, filed Dec. 2, 2008 and U.S. Provisional Application No. 61/141,446, filed Dec. 30, 2008, which are incorporated herein by reference in their entirety.

FIELD OF THE INVENTION

The invention relates to an RFID transponder and a method of operating an RFID transponder. More specifically the present invention relates to passive entry device and a method of operating a passive entry device.

BACKGROUND OF THE INVENTION

RFID transponders are used in numerous different applications such as identification or passive or keyless entry systems. The most valuable and limited resource in any RFID transponder is power or energy the RFID needs for operation. Therefore, it is common practice that RFID transponders monitor the received radio frequency signals and check whether or not they contain a specific wake pattern. For this purpose, conventional RFID transponders include a wake pattern mechanism which continuously monitors the incoming signals and issues a wake signal for other components of the RFID transponder if the wake pattern is detected. However, although a substantial amount of power can be saved since the most power consuming parts of the RFID transponder are in power-down mode until the wake pattern is detected, it is desirable to further reduce power consumption.

Keyless entry systems and passive entry systems to which the present invention can advantageously be applied are known from U.S. Pat. No. 6,323,566 B1 and U.S. Pat. No. 6,489,886 B2.

SUMMARY OF THE INVENTION

It is a general object of the invention to provide an RFID transponder and a method of operating an RFID transponder having reduced power consumption in comparison to conventional RFID transponders.

One aspect of an RFID transponder, according to the present invention, is provided which includes an automatic gain control (AGC) stage for amplifying a radio frequency (RF) signal and for providing an amplified RF signal. The AGC stage has a control signal indicating an increase of the amplitude of the RF signal. There is a demodulator coupled to receive that amplified RF signal for demodulating the amplified RF signal and for providing a data signal. Furthermore, there is a burst detector coupled to receive the control signal of the AGC stage and adapted to provide a start signal in response to a change of the control signal indicating an increase of the amplitude of the RF signal. A wake pattern detector is coupled to receive the data signal and the start signal. The wake pattern detector is adapted to detect a predefined wake pattern in the data signal after having received the start signal and to output a wake signal if the predefined wake pattern is detected. The wake signal can be used to switch other stages of the RFID transponder from a power-down mode into an active (power on) mode. Generally the RFID transponder may be switched from any first operating mode (very low power mode, sleep mode) with small or zero power consumption to a second operating mode with higher power consumption in response to a successfully detected wake up pattern. The RF signal may be any radio signal regardless of the carrier frequency of transmission band. In particular, an LF signal at about 134 kHz can be considered an RF signal in the context of the invention. In this first aspect of the invention, a burst detector is provided which is coupled to receive a control signal from the AGC stage. Since the gain or amplification factor of the AGC stage continuously adapts to the amplitude of the received radio frequency signals (for example at an antenna of the RFID transponder) a control signal which is correlated with this amplification factor (or gain) can be used to detect an increase of the amplitude of the incoming radio frequency signal. The burst detector may then issue a start signal, for example a short pulse, for activating the wake pattern detector. In response to the start signal, the wake pattern detector starts monitoring the data signal and detects whether or not a wake pattern is contained in the received data signal.

Advantageously, the wake pattern signal may have a rather short bit length of less than 16 bits. Other advantageous embodiments may use wake patterns of 8, 6 or 4 bits. Wake patterns of a bit length of 4 bits have proven to be a very good compromise between safety against erroneous activation of the wake pattern detector and shortness of the wake pattern signal.

An RFID transponder may be adapted to return the wake pattern detector in a power-down mode after a period of time that is longer than a duration that relates to a valid single bit. If the RF signal uses a specific modulation, as for example, ON-OFF-keying, OFF and ON periods of the RF signal indicate high and low bits. If a specific OFF period or ON period of the RF signal is longer than defined for a single bit, this may be used to interrupt the wake pattern monitoring procedure and to return in a power down mode.

The RFID transponder may further be adapted to return the wake pattern detector into a power-down mode after a period of time that spans at least a single predefined wake pattern. Therefore, a short wake pattern is preferable over a long wake pattern as the period of time during which the wake pattern detector must be activated in order to detect the wake pattern can be kept short. This can provide a significant reduction in power consumption.

An aspect of the invention also provides a method of operating an RFID transponder. A start signal may be provided in response to an increase of the amplitude of a received RF signal. The RF signal is demodulated into a data signal. The data signal is monitored for a predefined wake pattern after the start signal occurred. If the wake pattern is detected, the RFID transponder is switched from a power-down mode into an active (power on) mode. Monitoring the data signal for a predefined wake pattern may be stopped when a predefined period of time has expired after receipt of the start signal. The predefined period of time may advantageously span at least one wake pattern.

BRIEF DESCRIPTION OF THE DRAWINGS

Further aspects of the invention will ensue from the description herein below of preferred embodiments of the invention with reference to the accompanying drawings, wherein:

FIG. 7 shows waveforms relating to another embodiment of the invention.

DESCRIPTION OF THE EMBODIMENTS

Figure 1:
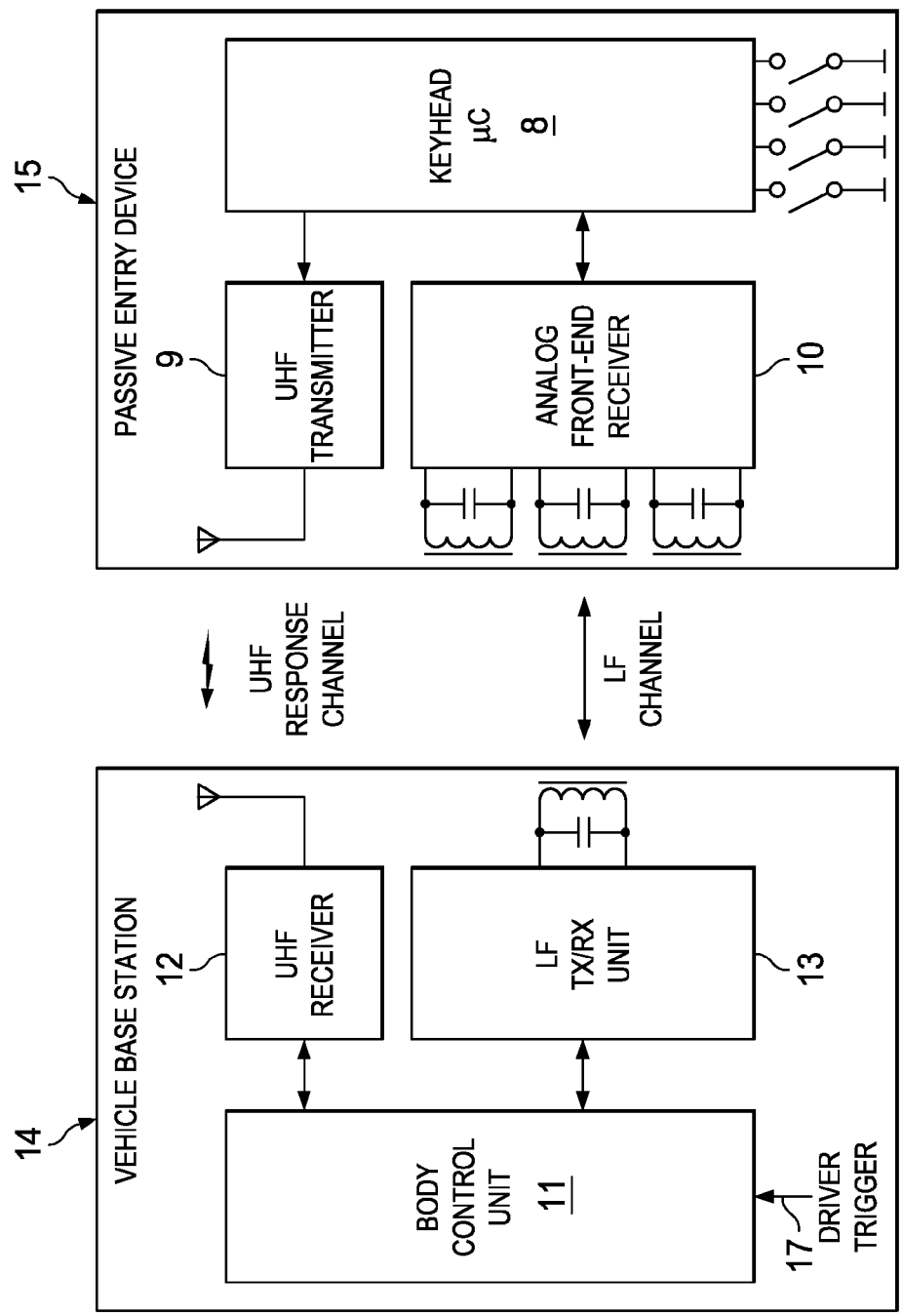
FIG. 1 shows a system in which the present invention can be used.

FIG. 1 shows a keyless entry or passive entry system (e.g. including an immobilizer system) to which the present invention can be applied. The vehicle base station 14 includes a body control unit 11 for controlling the entry and ignition procedure, an UHF (ultra high frequency) receiver and an LF (low frequency) transceiver 13 (i.e. a transmitter and a receiver). The body control unit may receive trigger signals 17 in order to perform specific operations. For example, an LF interrogation signal may regularly be send to the passive entry device 15. The passive entry device includes an RFID transponder in accordance with aspects of the invention. The passive entry device 15 includes an analog front end receiver 10, a (keyhead) microcontroller 8 and an UHF transmitter 9. Frequencies used in the UHF band are for example 315 MHZ in the USA and 433 MHz in Europe. LF frequencies are about 134 kHz. In the context of this application an RF signal can be an LF signal at about 134 kHz. A remote keyless entry function may be implemented as convenience feature unlocking and locking doors within 10 m around a vehicle, where the vehicle base station is located. The LF channel is used for a two way data exchange using typically a challenge response principle for authentication or verification of an identity. Security of the low frequency signal (LF) is maintained by using an encryption key which is known only to the vehicle base station 14. Triggered systems would have detection switches at the door handles to initiate activation or readings, whereas polling systems perform repeated reads. The invention provides improved circuitry and methods of operating the passive entry device (transponder).

Figure 2:
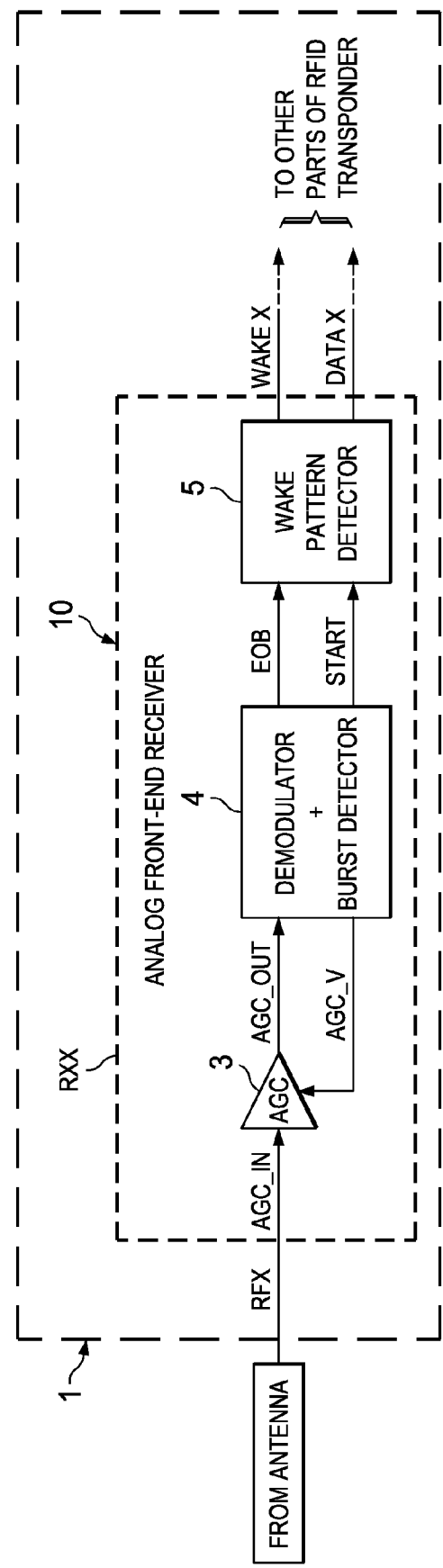
FIG. 2 shows a simplified block diagram of an embodiment of the invention.

FIG. 2 shows a simplified block diagram of an embodiment of the invention. FIG. 2 relates to an RFID transponder with a single receiving channel and shows an embodiment of the analog front end receiver 10 shown in FIG. 1. The data from a base station and noise may be received with an antenna which may be implemented as an external component to the RFID transponder 1 (i.e. the antenna may not be integrated on an integrated circuit which includes many or all of the stages and circuits shown in FIGS. 2, 3 and 5). The received radio frequency signal RFX is fed to the automatic gain control (AGC) stage 3 as input signal AGC_IN. After being amplified, the amplified RF signal AGC_OUT is passed to demodulator and burst detection stage 4. Demodulator and burst detection stage 4 demodulates the amplified RF signal AGC_OUT and provides a data signal EOB which is passed to wake pattern detector 5. A control signal AGC_V is fed from demodulator and burst detection stage 4 to AGC stage 3. Control signal AGC_V serves to control the gain (or as later described the attenuation) of AGC stage 3.

Figure 3:
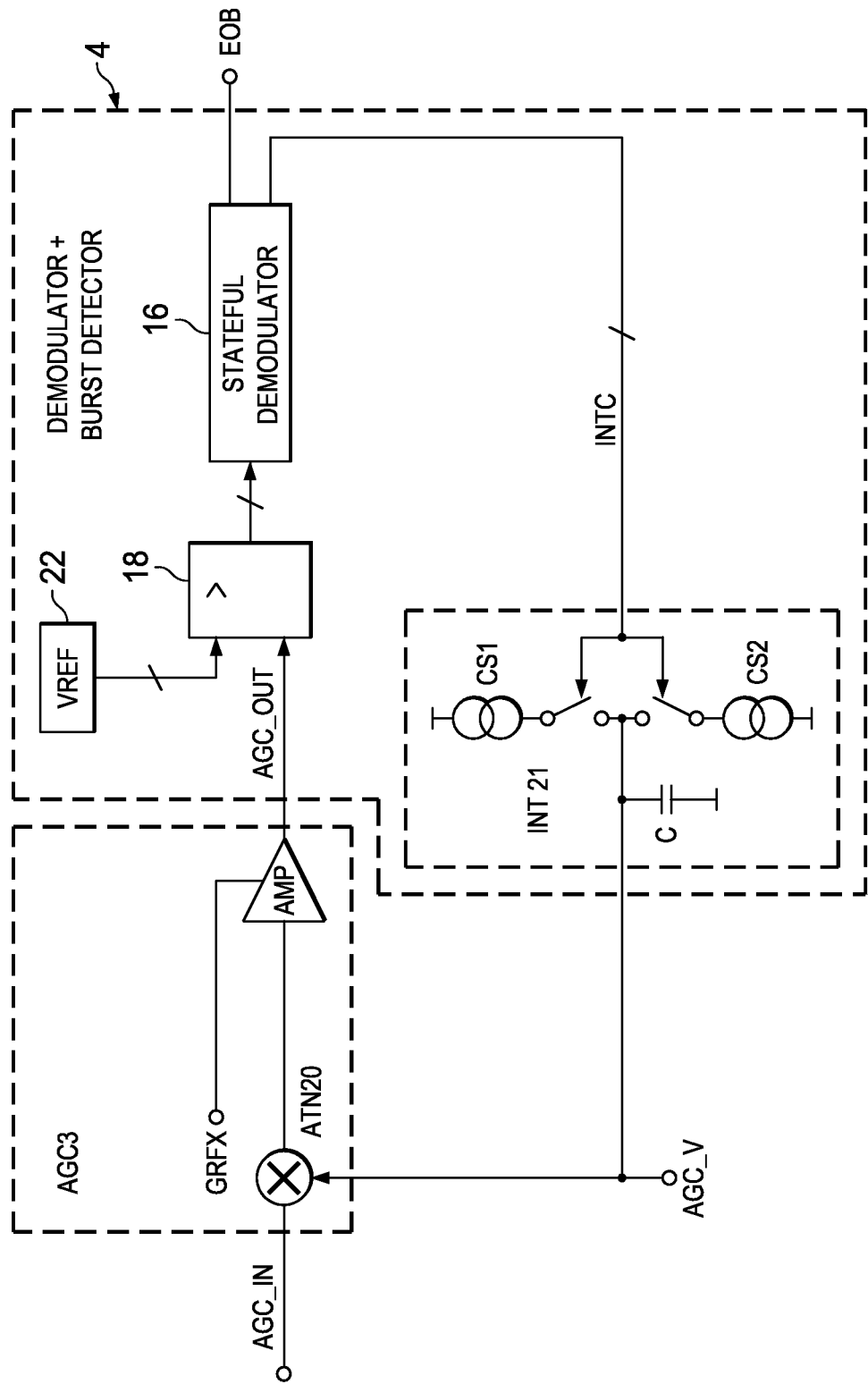
FIG. 3 shows a simplified block diagram of another embodiment of the invention.

Demodulator and burst detection stage 4 is also adapted to detect a specific change in signal AGC_OUT that indicates or reflects a sudden increase of the amplitude of the received RF signal RFX. A circuit and mechanism that is suitable to reflect such a sudden increase of the amplitude of received RF signal RFX is described in more detail here below with respect to FIG. 3 and FIG. 4. FIG. 3 shows an embodiment of an AGC stage 3 in more detail. The control signal AGC_V is an indicator of the gain (or rather of the inverted gain, i.e. of the attenuation) of the AGC stage 3. Every time a sudden increase of the amplitude of the received RF signal RFX occurs, this is indicated by control signal AGC_V and demodulator and burst detection stage 4 issues a start signal START. The start signal START activates wake pattern detector 5 that begins monitoring data signal EOB. If wake pattern detector 5 detects a predefined wake pattern (i.e. for a example a specific bit pattern) in data signal EOB, it issues a wake signal WAKEX to other parts of the RFID transponder. Wake pattern detector 5 may also relay the data signal EOB to the other components through data output DATAX. The wake pattern detector can be adapted to return into a power-down mode after a predefined period of time, which relates to the bit length of the wake pattern. This timeout mechanism (e.g. a timer or error detector) may be implemented in wake pattern detector 5.

FIG. 3 shows a simplified circuit diagram of an AGC mechanism according to an embodiment of the invention. The input signal AGC_IN (i.e. for example received LF signal RFX) is attenuated (variably) in attenuator ATN 20 and then amplified with amplifier AMP. Amplifier AMP has a pre-set gain that is basically set through hardware configuration and optionally with gain setting signal GRFX. The amplified signal AGC_OUT is compared to one or more reference voltage levels generated in reference voltage generator VREF 22 in comparator stage 18. The result of the comparison (logic high or logic low values) is passed to a stateful demodulation stage 16. In an embodiment comparator stage 18 may include three comparators or a comparator adapted to perform three comparisons. The reference voltage levels for the comparison provided by reference voltage generation stage 22 may then be THRS, THR1 and THR2, i.e. three different reference voltage levels. The concept of using three different levels and three corresponding comparisons (or individual comparators) is explained in more detail here below with respect to FIG. 4. The stateful demodulation stage 16 and comparator stage 18 may form part of the demodulation and burst detection stage 4 shown in FIG. 2. The stateful demodulation stage 16 provides output signal EOB which is passed to the wake pattern detector 5. The stateful demodulation stage 16 controls an integrating circuit INT 21 with an integration control signal INTC in response to the demodulated signal. Integrating circuit INT 21 may include two current sources CS1 and CS2 for charging and discharging a capacitor C. The voltage level on capacitor C may be used to control an attenuation stage 20. The signal used for controlling the attenuation of attenuation stage 20 is control signal AGC_V.

The input signal AGC_IN may have a wide dynamic range of about 70 dB. The AGC stage may adapt to the input voltage during a wake burst of the input signal AGC_IN. The wake burst may be in the range of several hundreds of µs up to one millisecond, for example 500 µs. A wake level (reached during a wake period) is predetermined and reaching the level can be used for setting the gain (GRFX) of the AGC stage appropriately. However, gain settings GRFX may be optional or only one fixed gain value may be used for a specific application or configuration and the AGC may only be controlled through the attenuation attenuator ATN 20. After having adapted to the wake burst, the gain (attenuation) is kept almost constant (only slow change to the attenuation). In particular, during demodulation the attenuation is only slightly adjusted. The demodulation is interrupted, if a stronger RF signal is received or if a bit timeout occurs. Accordingly, the RF signal AGC_IN is attenuated by the variable attenuator ATN 20 and then amplified with a fixed gain in amplifier AMP. The gain (signal GRFX) can be determined and set for a specific configuration through a closed loop feedback (not shown). The pre-set gain of amplifier AMP may be predetermined by the amplifier design (hardware). A wake level can be considered to be the minimum input amplitude at which the circuit starts working. Signal GRFX is an optional additional signal for adjusting the amplification or gain of the amplifier in order to set a specific wake level for an application. The wake level can be determined by the ratio of the reference level THRS for the target output amplitude of signal AGC_OUT and the gain of the amplifier (i.e. THRS/gain).

Figure 4:
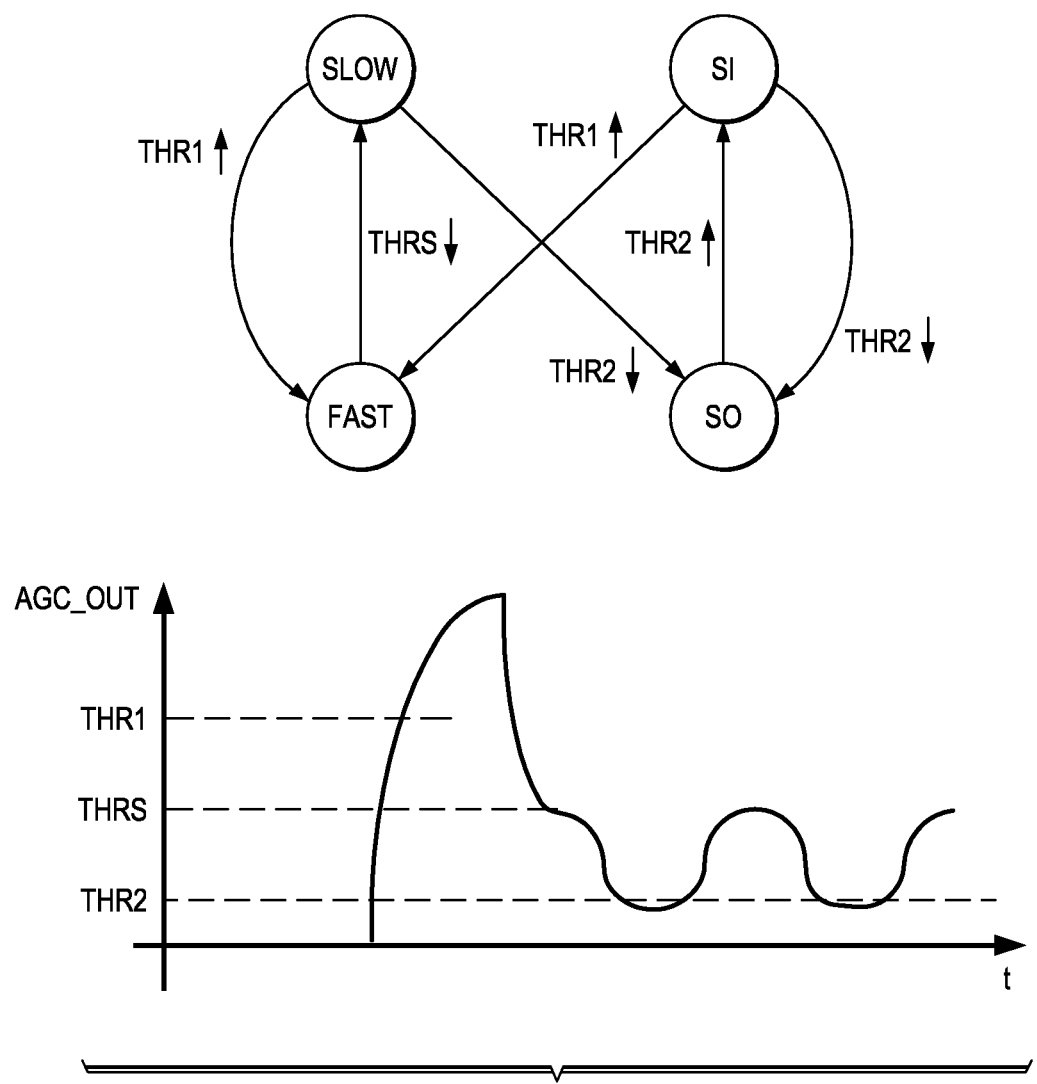
FIG. 4 shows a state diagram for the stateful demodulator of FIG. 3 and an illustrative waveform for a signal shown in FIG. 3.

FIG. 4 shows a state diagram for the stateful demodulation stage 16 of FIG. 3 and an illustrative waveform for signal AGC_OUT. The state diagram shows four states SLOW, FAST, S1 and S0. SLOW indicates slow adaption of the attenuation (gain) of the AGC stage 3. FAST indicates quick adaption of the attenuation. S1 indicates that AGC_OUT is above reference level THRS2 and S0 indicates that AGC_OUT is below reference level THRS2. There is the following convention for the transitions form one state to another.

THRS↑ indicates that AGC_OUT transitions the reference voltage level THRS from a voltage level of AGC_OUT that is lower than THRS to a voltage level that is greater than THRS. In other words, AGC_OUT rises above THRS. THRS↓ indicates that AGC_OUT transitions the reference voltage level THRS from a voltage level of AGC_OUT that is greater than THRS to a voltage level that is lower than THRS. In other words, AGC_OUT drops below THRS.

THR1↑ indicates that AGC_OUT transitions the reference voltage level THR1 from a voltage level of AGC_OUT that is lower than THR1 to a voltage level that is greater than THR1. In other words, AGC_OUT rises above THR1. THR1↓ indicates that AGC_OUT transitions the reference voltage level THR1 from a voltage level of AGC_OUT that is greater than THR1 to a voltage level that is lower than THR1. In other words, AGC_OUT drops below THR1.

THR2↑ indicates that AGC_OUT transitions the reference voltage level THR2 from a voltage level of AGC_OUT that is lower than THR2 to a voltage level that is greater than THR2. In other words, AGC_OUT rises above THR2. THR2↓ indicates that AGC_OUT transitions the reference voltage level THR1 from a voltage level of AGC_OUT that is greater than THR2 to a voltage level that is lower than THR2. In other words, AGC_OUT drops below THR2.

The waveform below the state diagram shows a possible relationship of the thresholds or reference voltage levels THRS, THR1 and THR2. According to this embodiment THR2<THRS<THR1.

As long as no transition of level THRS occurs, the demodulation stage 16 (which may e.g. be a state machine controlled by the outputs of three comparators in the comparator stage 18) remains in state FAST (default state, no signal received). This means that the gain (attenuation) of the AGC stage can be quickly adapted (short time constant). If a transition of reference voltage level THRS occurs, the stateful demodulation stage 16 changes to state SLOW.

However, if in state SLOW a transition of reference level THR1 occurs, stateful demodulator changes to state FAST. In state FAST a burst is detected and quick adaption of the attenuation (gain) of the AGC is performed. As long as stateful demodulator remains in state FAST, it can quickly adapt to the received signal and follow relatively sharp rising or falling slopes of the received RF signal.

Once signal AGC_OUT drops below reference voltage level THRS a transition back to state SLOW occurs and the adaption speed (speed of adjusting the attenuation of ATN 20) of the AGC is reduced. If the signal AGC_OUT drops further and below reference level THR2, stateful demodulator 16 assumes state S0. This means that demodulation of signal AGC_OUT is started. The attenuation (gain) of AGC 3 is basically kept constant during this stage (S0 is only reached from state SLOW). During a normal downlink operation the signal AGC_OUT may now toggle around reference voltage level THR2 and stateful demodulator 16 toggles between states S0 and S1 indicating demodulation of the signal. Based on this signals incoming data is determined and data signal EOB can be generated. However, if another burst occurs in state S1, this causes signal AGC_OUT to rise above reference voltage level THR1 and stateful demodulator 16 returns to state FAST in order to quickly adapt attenuation (gain) of AGC stage 3. The attenuation is adjusted in order to comply with the target amplitude for AGC_OUT which is equal to reference voltage level THRS.

In other words, in this embodiment, a first reference voltage level THR1 is used for detecting or indicating a new burst. The output of a comparator (e.g. in stage 18) having THR1 as reference input voltage level may be used to produce the START signal shown in FIG. 2. A second reference voltage level THR2 may be used for demodulation of the received and amplified RF signal. An output signal of a comparator (e.g. in stage 18) may then be used for generating data signal EOB shown in FIG. 2 and in FIG. 3. The reference voltage level THRS which is chosen with respect to the target output amplitude of AGC_OUT, may be used for generating signal INTC, shown in FIG. 3, which is a multibit or multivalent signal used for controlling signal AGC_V for the AGC stage 3.

Figure 5:
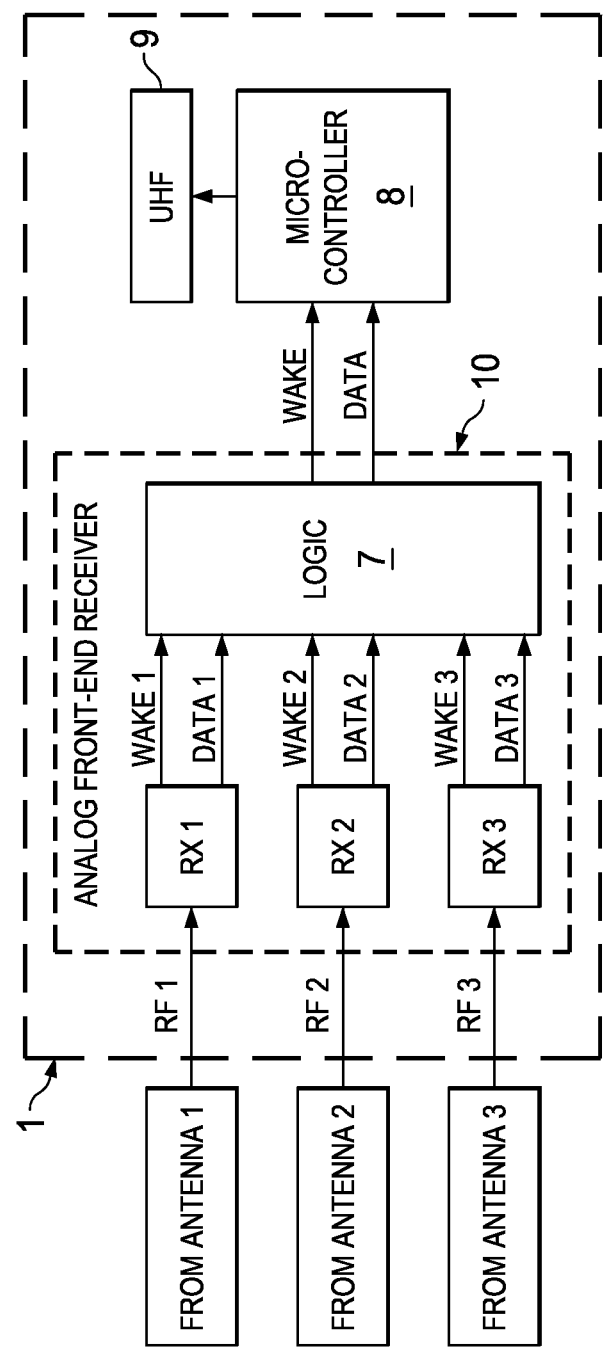
FIG. 5 shows a simplified circuit diagram of an automatic gain control stage according to aspects of the invention.

FIG. 5 shows a simplified block diagram of another embodiment of the invention. The RFID transponder 1 of FIG. 5 includes three similar receiving channels each of which is coupled to an antenna 1, 2 or 3. Each antenna receives an RF signal RF1, RF2, and RF3, respectively. Each of stages RX1, RX2, and RX3 is implemented in accordance with stage RXX shown in FIG. 2. Each stage RX1 to RX3 includes an automatic gain control amplifier, a demodulator, a burst detector and a wake pattern detector as shown in FIG. 2. The respective output signals WAKE1, DATA1, WAKE2, DATA2 and WAKE3, DATA3 are fed to a control logic 7, which is adapted to select the first valid wake up signal (the first signal WAKE1, WAKE2 or WAKE3 that arrives) to provide a wake signal WAKE to microcontroller 8, which is coupled to a ultra high frequency stage 9 which may also be woken up if necessary.

The main advantage of the embodiment shown in FIG. 5 is that three antennas ANTENNA1, ANTENNA2, and ANTENNA3 are provided each of which can be set up in a different direction such that a three-dimensional receiver is provided. The three-dimensional receiver is insensitive as to the specific position and orientation of the RFID transponder with respect to an RF signal transmitted to the RFID transponder. In order to save power, it is advantageous to provide the same number of wake pattern detectors and burst detectors as antennas.

Figure 6:
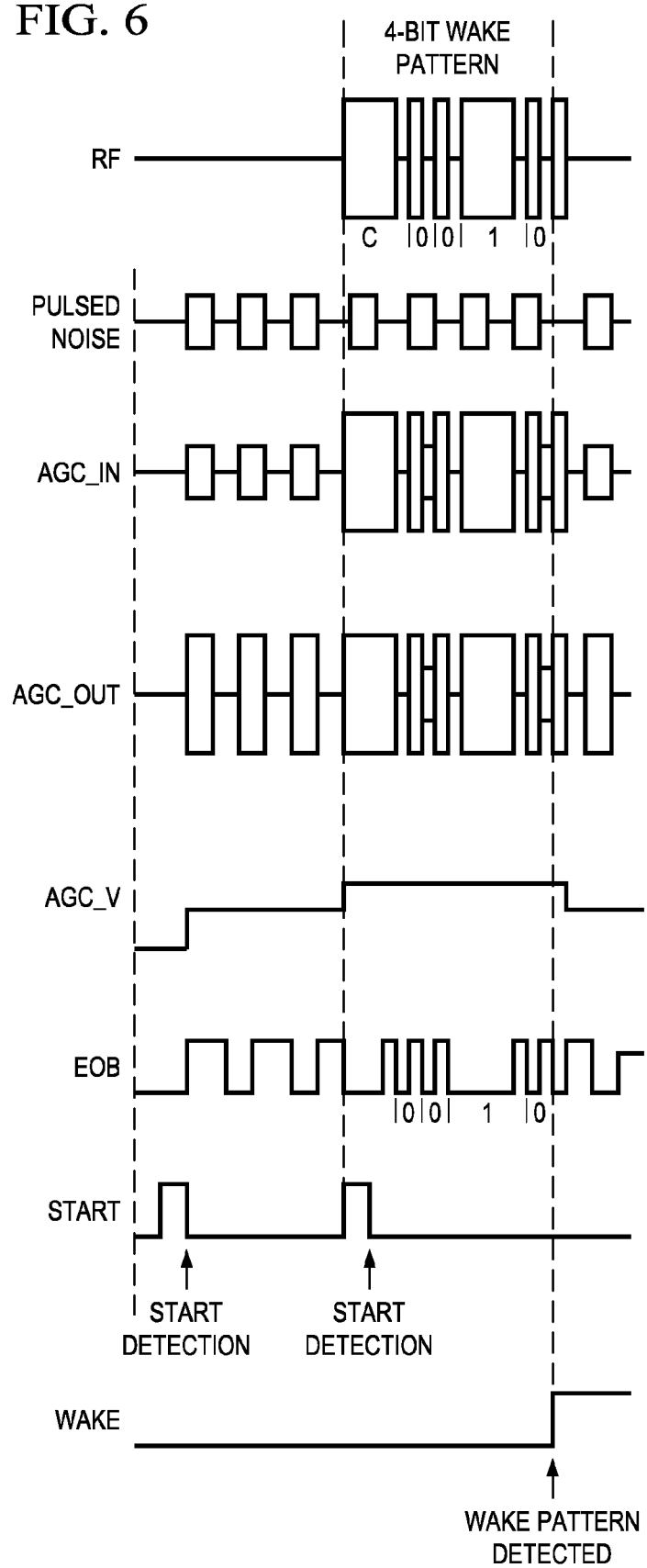
FIG. 6 shows waveforms relating to the embodiments of invention.

FIG. 6 shows waveforms relating to the embodiments of the present invention. The RF signal RF is represented by its envelope and in a form as it is transmitted from a base station to the RFID transponder. RF signal may have a carrier frequency of about 134 kHz. The oscillation of the carrier is not shown. The RF signal includes a wake phase C during which the RFID transponder adjusts to the amplitude of the received RF signal. The wake phase C is followed by a downlink (downlink means transmission from the base station to RFID transponder and uplink from the RFID transponder to the base station) data transmission. For downlink data transmission an amplitude shift keying (ASK) modulation, or more specifically an on-off keying (OOK) is used. Data transmission starts with a bit pattern which represents the 4 bit wake pattern. A logic '1' is coded with a on phase that is longer than the on phase for a logic '0'. The wake pattern in this example is '0010'.

At the antenna or antennas of RFID transponders as shown in FIGS. 1 to 3, and 5 the radio frequency signal RF may typically be overlapped by pulsed noise as shown in the second column of FIG. 6. The resulting signal (including the RF signal and noise) is the input signal of the automatic gain control stage AGC_IN. The amplitude of signal AGC_IN is maximum when the radio frequency signal RF is transmitted. The output signal of the AGC stage AGC_OUT shows that the AGC stage automatically amplifies the received RF signal AGC_IN such that AGC_OUT has a constant amplitude. However, the control signal AGC_V of the AGC reflects the changing amplification factor (attenuation of ATN 20) of the AGC stage. AGC_V represents the behavior of the envelope of the received RF signal AGC_IN. As the response of the AGC stage is predefined and limited, the control signal AGC_V changes slowly and indicates only significant and lasting changes in the input amplitude of the received RF signal AGC_IN as explained with respect to FIG. 3 and FIG. 4. The amplified signal AGC_OUT is demodulated and data signal EOB is provided. Each time a sudden increase in control signal AGC_V occurs, a start detection pulse of start signal START is issued from demodulator and burst detector 4 shown in FIG. 2. After each start detection pulse, data signal EOB is analyzed in wake pattern detector 5 of FIG. 2. After the second start pulse START, wake pattern '0010' is detected. Therefore, wake pattern detector 5 indicates with wake signal WAKE that a wake pattern was detected and other components (e.g. microcontroller etc.) of the RFID transponder can be switched into active mode, i.e. they may be switched on.

FIG. 7 shows waveforms relating to another embodiment of the invention. The RFID transponder according to this aspect of the invention includes a timeout mechanism for the wake pattern detector. The signals shown in FIG. 7 are basically the same as the signals shown in FIG. 6. However, there is a predefined timeout period after each start pulse which provides that the wake pattern detector 5 (shown in FIG. 2) is switched off or returned to a power-down mode when the timeout period has expired. The timeout period Toff may be long enough to span the wake period C and at least the time of one wake pattern, i.e. the timeout period Toff may be long enough to ensure that at least a single wake pattern can be detected. The timeout period Toff may also be set in accordance with a bit length, i.e. for example in accordance with the length of an ON and/or an OFF period of the RF signal that represent a high or a low bit. After a time that is longer than admissible for a single bit (e.g. a long break in the input signal) a timeout may be detected and the device can return to a power down mode. The timeout may also use a combination of bit error detection (bit timeout) and wake pattern related timeout. The period of time during which current (power) is consumed in the wake pattern detector is kept as short as possible while outside the timeout period Toff only standby current is consumed in the RFID transponder. Short wake patterns with less than 16 bits, for example, 8, 6 or 4 bits, are particularly advantageous as the timeout period Toff can be short.

Although the present invention has been described in detail, it should be understood that various changes, substitutions and alterations can be made hereto without departing from the spirit and scope of the invention as defined by the appended claims.

The invention claimed is:

1. An RFID transponder comprising:
an automatic gain control (AGC) stage for amplifying a radio frequency (RF) signal and for providing an amplified RF signal, the AGC stage configured to detect a change in the RF signal level from a nonzero level to a predetermined level and generating a control signal indicating an increase of the amplitude of the RF signal, the AGC stage having 3 control loops one for each antenna in a three-dimensional configuration and a state machine providing a fast response before a transition in the RF signal and a slower response to the RF signal after a transition in the RF signal above a predetermined level, wherein a correct but weaker than noise signal can be correctly demodulated;
a demodulator coupled to receive the amplified RF signal for demodulating the amplified RF signal and for providing a data signal;
a burst detector coupled to receive the control signal of the AGC stage and adapted to provide a start signal in response to a change of the control signal; and
3 wake pattern detectors coupled to receive the data signal and the start signal, wherein the wake pattern detector is adapted to detect a predefined wake pattern in the data signal after having received the start signal and to issue a wake signal if the predefined wake pattern is detected for switching the RFID transponder from a first operating mode into a second operating mode having higher power consumption than the first operating mode.

2. The RFID transponder according to claim 1, wherein the data signal is a binary signal and the wake pattern has a bit length of less than sixteen bits.

3. The RFID transponder according to claim 2, wherein the bit length is four.

4. The RFID transponder according to claim 2, wherein the wake pattern detector is returned to a power-down mode after a period of time that is longer than a duration that relates to a valid single bit.

5. The RFID transponder according to claim 2, wherein the wake pattern detector is returned to a power-down mode after a period of time that spans a single predefined wake pattern.

6. The RFID transponder according to claim 1, wherein the wake pattern detector is returned to a power-down mode after a period of time that is longer than a duration that relates to a valid single bit.

7. The RFID transponder according to claim 6, wherein the wake pattern detector is returned to a power-down mode after a period of time that spans a single predefined wake pattern.

8. The RFID transponder according to claim 1, wherein the wake pattern detector is returned to a power-down mode after a period of time that spans a single predefined wake pattern.

9. Method of operating an RFID transponder, the method comprising:
providing a start signal in response to an increase of the amplitude of one of 3 radio frequency (RF) signals received with one of 3 antennas of the RFID transponder where the increase in the amplitude is from a nonzero level to a predetermined level, wherein a correct but weaker than noise signal can be correctly demodulated;
demodulating the RF signal into a data signal;
monitoring the data signal for a predefined wake pattern after the start signal occurred; and switching the RFID transponder from a power-down mode into an active mode if the wake pattern is detected.

10. The method of claim 9, further comprising returning the wake pattern detector into power-down mode when a period of time has expired after receipt of the start signal which covers a single wake pattern or which is longer than a duration relating to a valid single bit.

* * * * *